United States Patent [19]

Miyadera

[11] Patent Number: 4,690,241
[45] Date of Patent: Sep. 1, 1987

[54] CONSTRUCTION FOR MOUNTING SERVICE HOLE BLANK CAP OF A CONSOLE BOX

[75] Inventor: Kazuhiko Miyadera, Toyota, Japan

[73] Assignee: Toyota Jidosha Kabushiki Kaisha, Aichi, Japan

[21] Appl. No.: 828,618

[22] Filed: Feb. 13, 1986

[30] Foreign Application Priority Data

Feb. 14, 1985 [JP] Japan ............................ 60-019360[U]

[51] Int. Cl.$^4$ ............................................. B62D 25/20
[52] U.S. Cl. ................................... 180/315; 296/37.8; 296/37.14
[58] Field of Search .................... 296/37.8, 193, 37.12, 296/37.14; 180/315, 90, 90.6, 89.1

[56] References Cited

U.S. PATENT DOCUMENTS

| | | | |
|---|---|---|---|
| 4,365,826 | 12/1982 | Iriyama | 180/90 |
| 4,368,901 | 1/1983 | Kojima | 180/90 |
| 4,568,117 | 2/1986 | McElfish | 296/37.8 |

FOREIGN PATENT DOCUMENTS 168447 5/1978 Japan .
168477 2/1980 Japan .

Primary Examiner—Robert R. Song
Attorney, Agent, or Firm—Parkhurst & Oliff

[57] ABSTRACT

A construction for mounting a service hole blank cap of a console box is disclosed, wherein a portion of a slit formed in the console box, through which a hand brake lever penetrates, is a service hole. The undersurface of the peripheral edge of the blank cap abuts against the top surface of the rim of the service hole, and an engaging piece formed on the undersurface of the blank cap engages the undersurface of the rim of the service hole to thereby mount the blank cap. At least one fixing hole is formed in the top surface of the rim on each longitudinal side of the service hole. The blank cap is formed at the undersurface thereof with at least one fixing piece on each longitudinal side of the blank cap. Each fixing piece has a shape and location adapted for reception within a corresponding fixing hole to prevent longitudinal and transverse movement of said blank cap in said service hole.

17 Claims, 7 Drawing Figures

F I G. 7
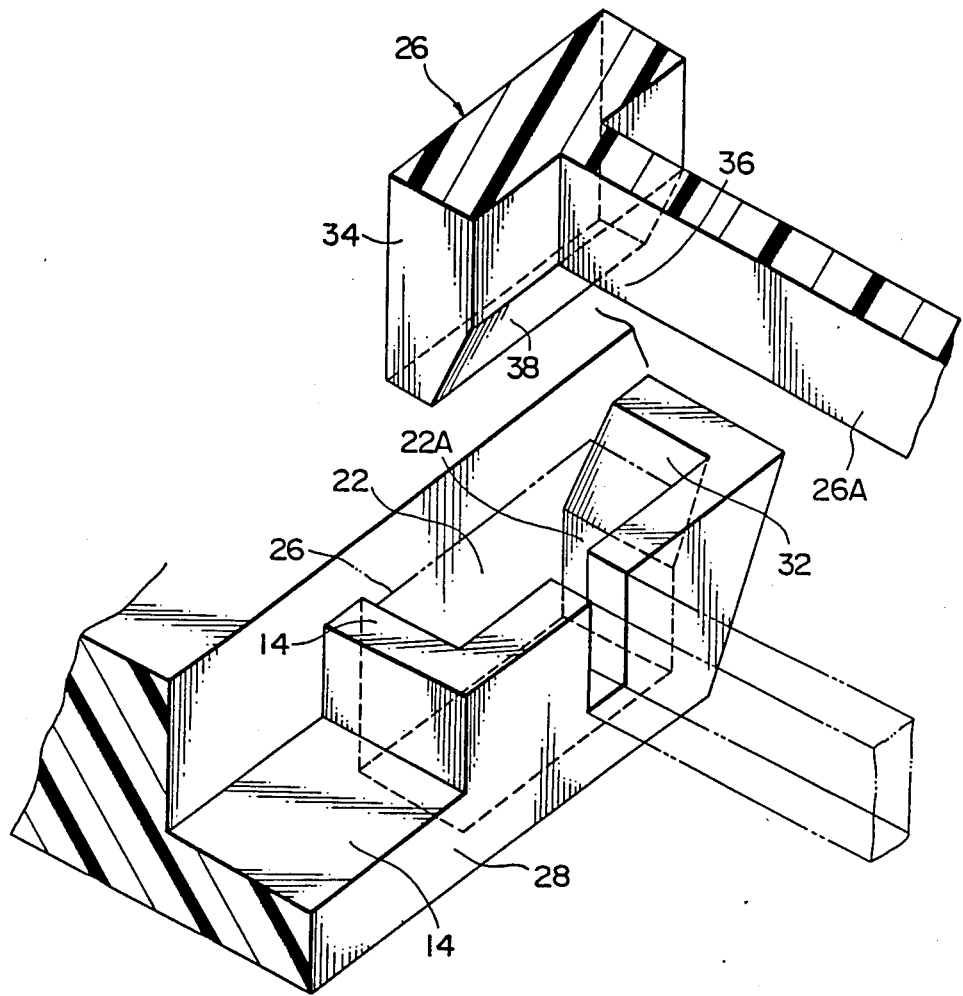

CONSTRUCTION FOR MOUNTING SERVICE HOLE BLANK CAP OF A CONSOLE BOX

BACKGROUND OF THE INVENTION

1. Field of the Invention

This invention relates to a construction for mounting a service hole blank cap of a console box. More particularly, the invention relates to improvements in a construction for mounting a service hole blank cap of a console box, wherein a portion of a slit through which a hand brake lever penetrates is made to be a service hole with a peripheral rim, the undersurface of the blank cap abutting against the top surface of the rim of the service hole, and an engaging pawl or pawls of an engaging piece or pieces formed on the underside of the blank cap engaging the undersurface of the rim of the service hole, to thereby mount the blank cap.

2. Description of the Prior Art

The conventional console box for a motor vehicle has a construction for receiving therein a proximal portion of a hand brake lever and covering a brake cable adjusting section connected to the proximal portion. Since the brake cable adjusting section is covered by the console box, it is troublesome to remove the console box as a whole to adjust the brake cable, whereby the adjusting operation is made more difficult and cumbersome.

In contrast thereto, as in Japanese Utility Model Kokai (Laid-Open) No. 168,447/1980, there is disclosed a console box for a motor vehicle with a service hole having a size sufficient for a repairman's hand to reach the brake cable adjusting section. The service hole is formed at a portion of the top surface of the console box and a blank cap is detachably mounted to this service hole.

However, in the console box of the type described, the blank cap is mounted to the service hole such that a plurality of engaging pieces integrally formed on the undersurface of the blank cap are engagingly fixed to the rim of the service hole. In consequence, since the blank cap is mounted to the service hole by mere fixing through use of the engaging pieces, the arrangement has the disadvantage that the blank cap is movable back and forth from side to side in the service hole, thereby creating rattling or vibrational noises.

Furthermore, there is proposed an arrangement in which the service hole is formed contiguous to the forward end of a slit through which the hand brake lever penetrates. In this case, since the rear end edge of the blank cap does not engage the top surface of the console box, the drawback is presented that the blank cap tends to be shifted rearward.

Furthermore, when a portion of slit through which the hand brake lever penetrates is formed to provide the service hole as described above, if the blank cap blocking the service hole is pressed from above, then the opposite end edge of the slit in the widthwise direction thereof tends to be fixed, so that the slit is flared and the blank cap falls into the service hole.

Additionally, when the portion of the slit through which the hand brake lever penetrates is formed to provide the service hole as described above, when the blank cap blocking the service hole is removed, it should be natural that a force applied to a rear end portion of the blank cap raises the blank cap upward. Preferably, the force is applied by insertion of a repairman's finger or tool to the rear end portion.

For example, it is proposed that a projection or the like be provided for restricting the longitudinal movement of the blank cap. The projection is formed at the forward end portion of the blank cap in the longitudinal direction of the vehicle and engaged with a recess or a hole formed on the rim of the service hole. In this case, if the blank cap is raised from the rear end portion thereof so that the blank cap rocks or pivots about its forward end portion, a disadvantage is presented such that the projection or the like, which has been engaged with the recess or the hole, tends to be broken.

SUMMARY OF THE INVENTION

It is therefore the primary object of the present invention to provide a construction for mounting a service hole blank cap of a console box, wherein, when the blank cap is mounted to the service hole, the blank cap is not movable back and forth and from side to side.

Another object of the present invention is to provide a construction for mounting a service hole blank cap of a console box, wherein, even if the blank cap is pressed from above, it does not fall into the service hole.

A further object of the present invention is to provide a construction for mounting a service hole blank cap of a console box, wherein movement of the blank cap in the longitudinal direction when it is mounted to the service hole is prevented, and breakage is not easily caused to an engaging pawl or pawls and the like when the blank cap is detached.

To this end, the present invention contemplates a construction for mounting a service hole blank cap of a console box, wherein a portion of a slit formed in the console box, through which a hand brake lever penetrates, is a service hole. The undersurface of the peripheral edge of the blank cap abuts against the top surface of the rim of the service hole, and an engaging piece formed on the undersurface of the blank cap engages the undersurface of the rim of the service hole to thereby mount the blank cap. At least one fixing hole in the top surface of the rim is formed on each longitudinal side of the service hole. The blank cap is formed at the undersurface thereof with at least one fixing piece on each longitudinal side of the blank cap. Each fixing piece has a shape and location adapted for reception within a corresponding fixing hole to prevent longitudinal and transverse movement of the blank cap in the service hole.

To the above end, the present invention contemplates that two fixing pieces are provided at positions adjacent a rearward end portion of the blank cap nearest the hand brake lever.

In addition, the present invention contemplates that each of the fixing holes is formed on the top surface of the rim thereof with a cutout opening in the transverse direction of the vehicle, and each of the fixing pieces is provided with a movement control piece for reception within the cutout.

The present invention also contemplates that each fixing piece includes a fixing piece body from which the movement control piece transversely extends, the fixing piece body projecting downward to a greater extent than the movement control piece.

Further, the present invention contemplates that the fixing holes and the fixing pieces are arranged in pairs at positions opposed to each other in the transverse direction of the service hole, the fixing pieces being connected to each other by a reinforcement integrally formed on the undersurface of the blank cap. The movement control pieces of the fixing pieces also form a pair which may be connected to each other by a reinforcement integrally formed on the undersurface of the blank cap.

According to the present invention, at least a pair of fixing pieces provided on the undersurface of the blank cap engage the fixing holes on the rim on the opposite sides in the widthwise direction of the service hole, so that the blank cap does not shake or move in the longitudinal direction thereof.

Futhermore, the pair of fixing pieces suppress the flaring of the rim on the opposite sides in the widthwise direction of the service hole, so that the blank cap is prevented from falling within the service hole when the blank cap is pressed in.

Further, when the blank cap is detached by applying a finger to the end portion of the blank cap on the side of the hand brake lever, the engaging pawls and the like are prevented from being broken.

BRIEF DESCRIPTION OF THE DRAWINGS

The preferred embodiments of the invention will be discussed in detail herein with reference to the appended drawings, in which:

FIG. 7 is a disassembled perspective showing the essential portions of the above embodiment.

DETAILED DESCRIPTION OF THE PREFERRED EMBODIMENT

Description will hereunder be given to one embodiment of the present invention with references to the drawings.

Figure 1:
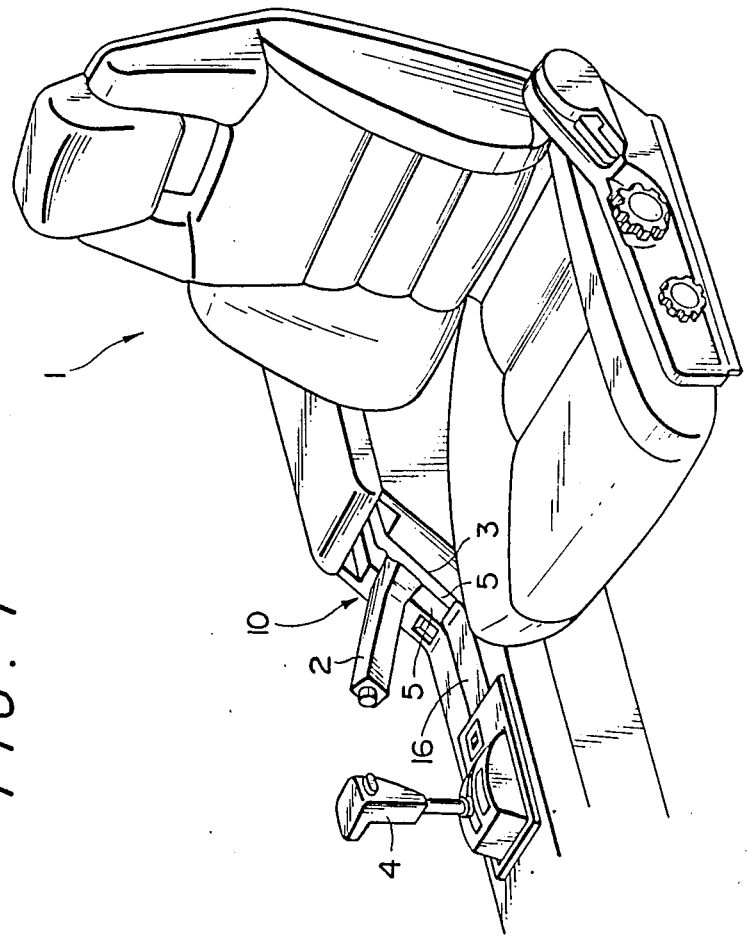
FIG. 1 is a perspective view showing an embodiment of the construction for mounting a service hole blank cap of a console box according to the present invention.

As shown in FIG. 1, a slit 3 is formed in the longitudinal direction of the vehicle on the console box 10 disposed on the inboard side of a driver's seat 1. A hand brake lever 2 penetrates the slit 3. A service hole 12 is formed as a forward portion of the slit 3 on the forward end thereof. A service hole blank cap 16 obstructs or covers the service hole 12. In FIG. 1, a pair of right and left-strips 5 cover the slit 3 for dusting and shielding. A shift lover 4 is located forward of the slit 3 for a transmission (not shown).

As shown in FIGS. 2 through 7, according to this embodiment, in the construction for mounting the service hole blank cap 16 of the console box 10, the undersurface 16A of the peripheral edge of the blank cap 16 abuts against the top surfaces of the rim 14 defining the service hole 12. The rim 14 is provided on opposite longitudinal sides of the service hole 12. An engaging pawl 21 of an engaging piece 20 on the undersurface of the blank cap 16 engages the undersurface of the rim 14 or the service hole 12, to thereby mount the blank cap 16. The engaging piece and pawl may be resilient to permit flexing of the engaging piece during mounting or disassembly. A pair of fixing holes 22 directed upward and offset outwardly from the inner peripheral surface 28 of the service hole 12 are formed on the top surfaces of the rims 14 on the opposite sides of the service hole 12. A cutout 24 for connecting the fixing holes 22 to the service hole 12 are formed on both sides of the service hole 12 and cross the rims 14 of the service hole 12. A pair of fixing piece 26 is formed on the undersurface 16A on opposite sides of the blank cap 16, each of the fixing pieces 26 having a shape capable of being received into the fixing hole 22 from above and coupled to the cutout 24.

Furthermore, the blank cap 16 is provided thereon with preferably two pairs of engaging pieces 20 abutting against the inner peripheral surface 28 of the service hole 12. Preferably, a first pair of engaging pieces 20 is located toward the forward edge portion of the service hole 12 furtherst from the slit 3 and hand brake 2. A second pair of engaging pieces 20 is preferably located between the first pair and the fixing pieces 26. The engaging pawl 21 is a lower portion of each engaging piece 20 and is integrally formed on the engaging piece 20 for cooperation with the undersurface of the rim 14.

Figure 2:
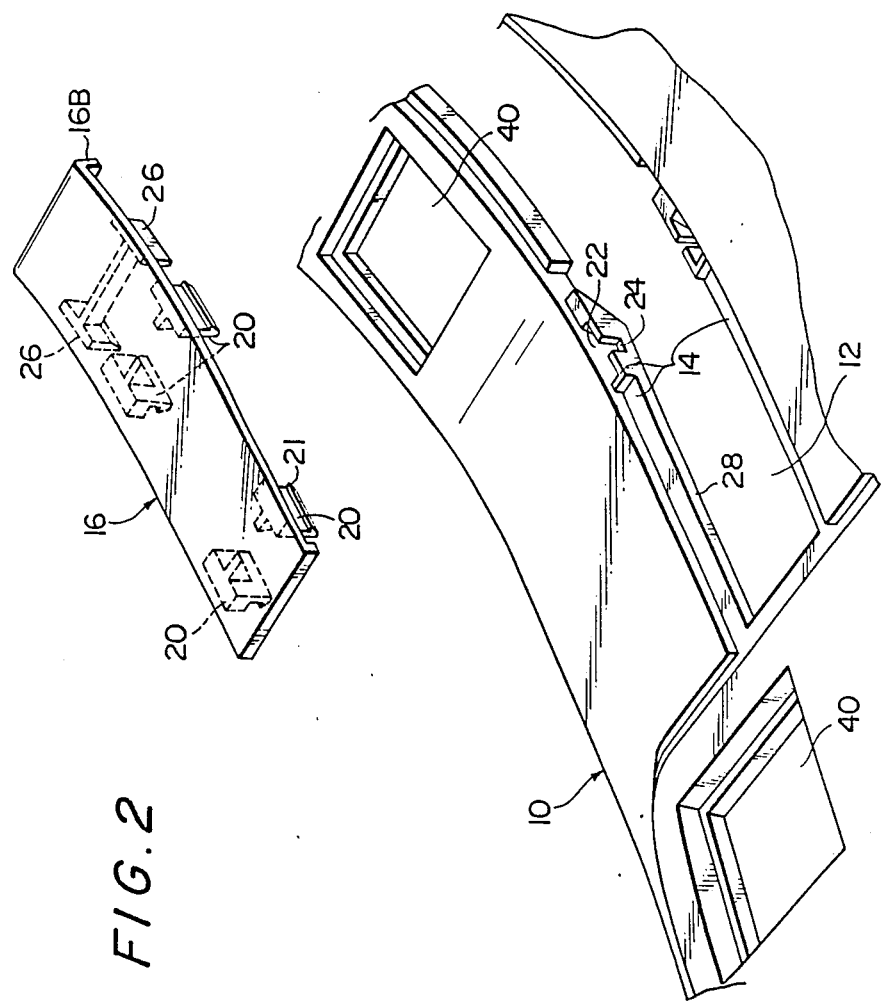
FIG. 2 is a disassembled perspective view showing the essential portions of the above embodiments.
Figure 3:
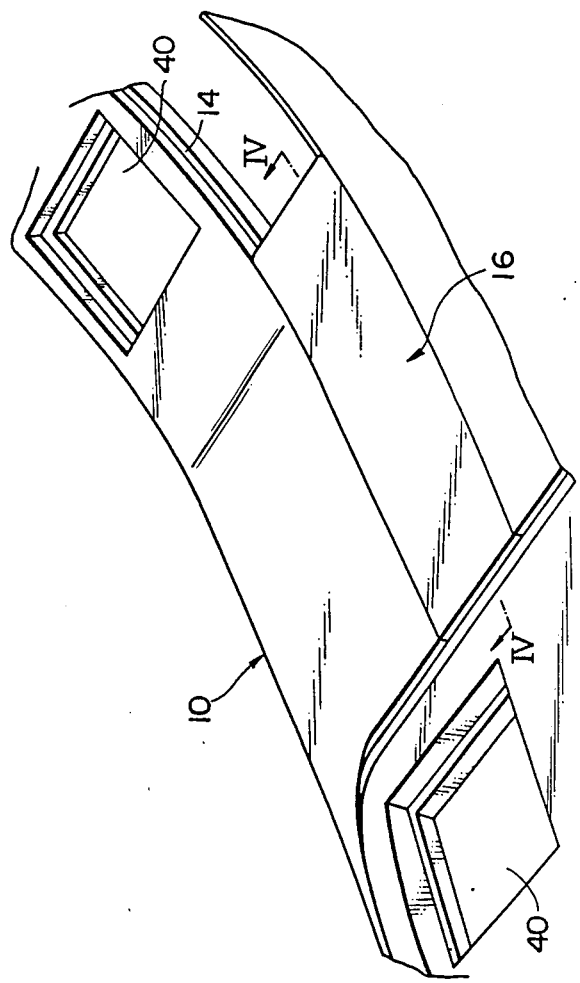
FIG. 3 is an assembled perspective view showing the above embodiments illustrated in FIG. 2.
Figure 4:
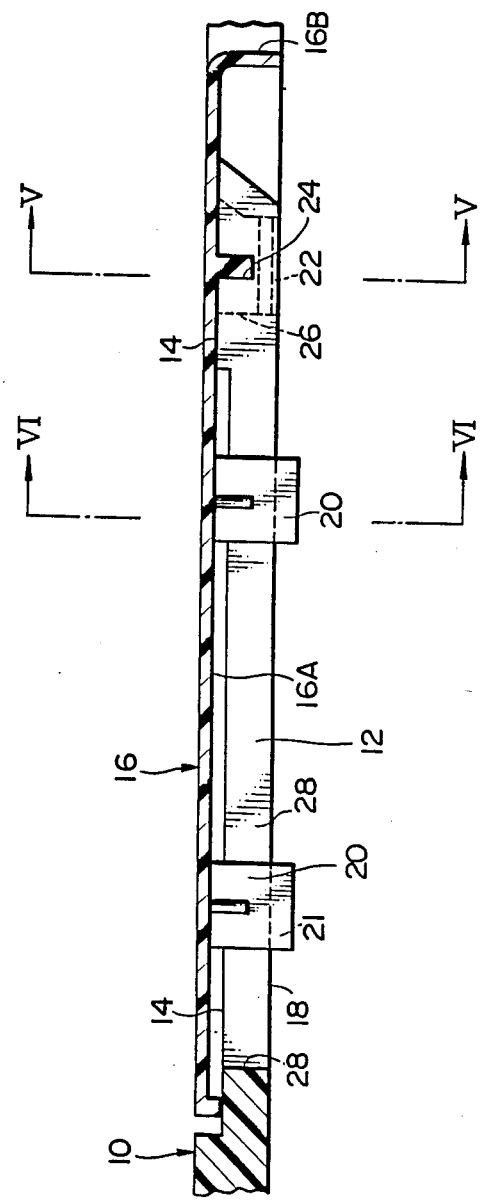
FIG. 4 is a sectional view taken along the line IV—IV in FIG. 3.

In the preferred embodiment, the pair of fixing pieces 26 are disposed at positions close to the rear end portion of the blank cap 16 nearest the hand brake lever 2 and more rearward than the first and second pairs of engaging pieces 20. As shown in FIGS. 2 and 7, each one of the square-shaped fixing holes 22 is formed on each of the straight lined rims 14 disposed on opposite sides of the service hole 12. An insertion guide surface 32 is formed on at least one of the upper portions of four inner surfaces 22A of each of the fixing holes 22. The guide surface 32 is inclined.

The fixing piece 26 includes a rectangular parallelepiped shaped fixing piece body 34 which is coupled into the fixing hole 22. The fixing piece 26 also includes a movement control piece 36 which is coupled into the cutout 24. Accordingly, the movement of the blank cap 16 is controlled in the transverse and longitudinal directions of the service hole 12 by reception of the body 34 and piece 36 into the fixing hole 22 and cutout 24, respectively.

Figure 5:
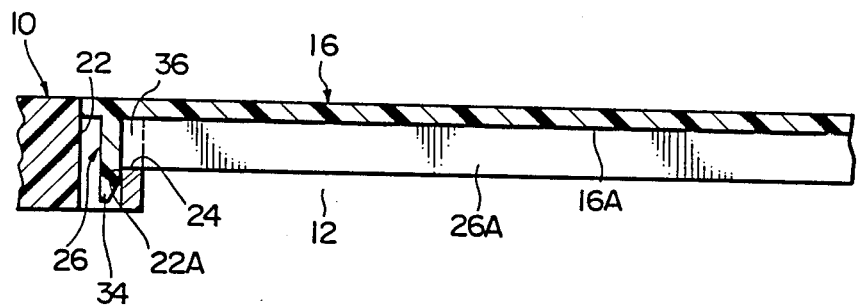
FIG. 5 is a sectional view taken along the lines V—V in FIG. 4.
Figure 6:
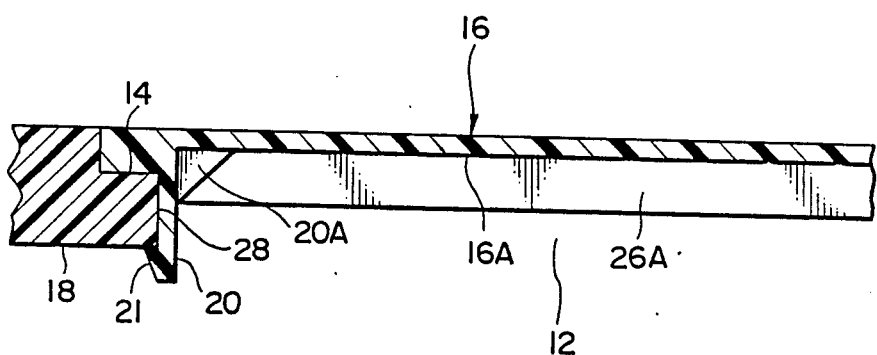
FIG. 6 is a sectional view taken along the line VI—VI in FIG. 4.

Furthermore, the fixing piece body 34 and movement control piece 36 of the fixing piece 26 are arranged such that the fixing piece body 34 projects lower than the movement control, piece 36, to thereby form a difference in height (refer to FIG. 5). That is, the bottom surface of the fixing piece body 34 is lower or extends downward to a greater extent than the bottom surface of the control piece 36.

The movement control pieces 36 of the pair of fixing pieces 26 are connected to each other by a reinforcement 26A provided on the undersurface 16A of the blank cap 16 in the widthwise or transverse direction of the blank cap 16, coaxially with the movement control pieces 36. In other words, the pair of right and left movement control piece 36 form a rod-shaped reinforcement in cooperation with the reinforcement 26A.

In FIG. 2, a bent end portion 16B is formed by bending downward an end portion of a rear end of the blank cap 16, i.e., the end portion on the side of the hand brake lever 2. The bent end portion 16B is preferably caught by a finger of a repairman inserted from the side of the slit 3 when the blank cap 16 is to be detached.

In FIG. 2, a switch mounting hole 40 is provided for mounting various control switches. This switch mounting hole 40 is provided on the console box 10 at a position close to the service hole 12.

In this embodiment, mounting of the blank cap 16 to the service hole 12 is performed such that the fixing pieces 26 are inserted into the fixing holes 22, and the engaging pawls 21 of the engaging pieces 20 are caught by the rims 14 of the service hole 12. During insertion, the resiliency of the engaging pieces and pawls permit their inward bending and passage below the rim, with subsequent outward movement to their original position once the pawl 21 travels below the rim.

In consequence, in the state where the blank cap is mounted to the service hole 12, the pair of fixing pieces 26 are inserted into the corresponding pair of fixing holes 22 formed on the rims 14 on the opposite sides in the widthwise direction of the service hole 12 thereby reinforcing and strengthening the rim. For this reason, for example, even when the blank cap 16 is pressed in from above, the fixing holes 22 are restrained by the blank cap 16 including the fixing pieces 26, so that deformation or flexing of the rim 14 of the service hole 12 can be controlled. In consequence, the blank cap 16 does not fall into the service hole by virtue of the flexing of the rim 14.

Furthermore, the movement control pieces 36 of the fixing pieces 26 are coupled from above into the cutouts 24 connecting the fixing holes 22 to the service hole 12, so that movement of the blank cap 16 in the longitudinal direction of the vehicle on the top surfaces of the rim 14 of the service hole 12 can be controlled. In consequence, when the blank cap 16 is mounted to the service hole 12, looseness in mounting in the longitudinal direction of the vehicle can be eliminated. Furthermore, the fixing pieces 26 are disposed at the positions close to the rear end of the blank cap 16 so that when a finger is applied to the bent end portion 16B to raise it so as to open the blank cap 16, the fixing pieces 26 can smoothly slip out of the fixing holes 22. In consequence, the fixing pieces 26 are not damaged during removal of the blank cap 16.

Furthermore, in this embodiment, as described above, looseness of the blank cap 16 back and forth and from side to side in the state where the blank cap 16 is mounted to the service hole 12 can be eliminated by the engaging pieces 20. In consequence, the engaging pawls 21 of the engaging pieces 20 suffice to control the looseness in the vertical direction of the blank cap 16, so that the width of engagement or contact area between the engaging pawl 21 and the undersurface of the rim 14 of the service hole 12 can be reduced. For this reason, when the blank cap 16 is removed, an excessively great force does not act on the engaging pawls 21 of the engaging pieces 20, so that the engaging pawls 21 are prevented from being broken upon repeated insertion and removal of the blank cap.

Furthermore, in this embodiment, the pair of fixing pieces 26 are integrally connected to each other by the reinforcement 26A, so that not only the strength of the fixing pieces 26 but also the strength of the blank cap 16 can be improved.

In a preferred embodiment, a reinforcement 20A (FIG. 6) is triangular in cross section and connects the undersurface 16A of the blank cap 16 to the back surface of the engaging piece 20. The reinforcement is formed integrally with the engaging piece 20 on the back surface of the engaging piece 20, whereby the engaging piece 20 is improved in strength, so that even if the blank cap 16 is repeatedly mounted and dismounted, the blank cap 16 can be prevented from being broken.

Furthermore, the fixing piece body 34 and the movement control piece 36 of the fixing piece 28 are arranged such that the fixing piece body 34 is projected downward to a greater extent than the movement control piece 36, to thereby form a difference in height. Therefore, when the fixing piece 26 is inserted and coupled into the fixing hole 22 so as to mount the blank cap 16 to the service hole 12, the forward end of the fixing piece body 34 is inserted into the fixing hole 22, and coupling of the movement control piece 36 into the cutout 24 formed in the fixing hole 22 can be readily performed without requiring any alignment.

Moreover, as shown in FIG. 7, the fixing hole 22 is formed into a square shaped hole on the top surface of the rim 14 of the service hole 12. The insertion guide surface 32 is progressively inclined and formed on the upper portion of the inner peripheral surface 22A of the fixing hole 22, which is perpendicular to the inner peripheral surface 28 of the service hole 12. Thus, insertion of the fixing piece 26 into the fixing hole 22 can be further facilitated because the inclined surface 32 guides the body 34 into the correct alignment with the hole 22. In consequence, when the blank cap 16 is mounted to the service hole 12, the insertion guide 32 serves as the positioning guide for the mounting, so that mounting and alignment can be facilitated.

Further, the fixing piece body 34 is provided at the forward end portion thereof with an insertion guide surface 38 formed on a portion of the side surface of the body 34. The body 34 is cut away obliquely so that the body is progressively reduced in cross section toward its bottom surface. Insertion and alignment of the fixing piece 26 into the fixing hole 22 are thus further facilitated.

Furthermore, the control switch mounting hole 40 is provided on the surface of the console box 10 at a position close to the service hole 12, so that the various control switches can be readily mounted to the control switch mounting hole 40 by use of the service hole 12 and without removing the console box 10.

Additionally, in the above embodiment, the fixing hole 22 has a square shape and the fixing piece 26 has a rectangular parallelepiped shape. However, the present invention need not necessarily be limited to this, and, in summary, such an arrangement may be adopted that the fixing holes 22 and the fixing pieces 26 have suitable shapes which cooperate with each other so as to be restrained in the rims 14 on the opposite sides of the service hole 12 in the widthwise direction thereof. For example, the fixing hole 22 and the fixing piece 26 may be formed into corresponding columnar shapes.

Furthermore, in the above embodiment, the positions where the fixing holes 22 are formed are provided on the top surfaces of the rims 14 of the service hole 12 at positions offset outward from the inner peripheral surface 28 of the service hole 12. However, the present invention need not necessarily be limited to this, and, for example, ribs or the like may be projected inward from the inner peripheral surface 28 of the service hole 12 and the fixing holes may be formed by the ribs at positions offset inward from the inner peripheral surface of the service hole 12.

In the above embodiment, each fixing piece 26 is provided with a movement control piece 36. However, the present invention need not necessarily be limited to this. If the fixing pieces 26 are prevented from moving in the longitudinal direction in the fixing holes 22, the movement control pieces 36 may be eliminated. Further, when the fixing piece 26 is not provided with the movement control piece 36, the fixing piece body 34 is not controlled in movement in the longitudinal direction due to the fixing hole 22, but merely restrained in movement in the widthwise direction of the service hole 12.

Furthermore, in the above embodiment, the two pairs of engaging pieces 20 of the blank cap 16 are provided along the opposite rim 14 of the service hole 12. However, at least one pair of engaging pieces 20 may suffice, and these engaging pieces 20 may be varied in number depending on the length of the top surface of the rim 14.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A construction for mounting a service hole blank cap in a service hole of a console box for a motor vehicle having longitudinal and transverse axes, a longitudinal slit being formed in said console box through which a hand brake lever penetrates, a portion of said slit defining said service hole, the construction comprising a rim defining a periphery of said service hole; an undersurface of a peripheral edge of said blank cap abutting against a top surface of said rim of said service hole; at least one engaging piece formed on an undersurface of said blank cap engaging an undersurface of the rim of the service hole to thereby releasably mount said blank cap on said rim in said service hole; at least one fixing hole being formed in the top surface of the rim on each longitudinal side of said service hole; and said blank cap being formed on the undersurface thereof with at least one fixing piece on each longitudinal side thereof, each having a shape and location adapted for reception within a corresponding one of said fixing holes to prevent longitudinal and transverse movement of the blank cap in the service hole.

2. The construction for mounting a service hole blank cap of a console box as set forth in claim 1, wherein two fixing pieces are provided at positions adjacent a rearward end portion of said blank cap nearest the hand brake lever.

3. The construction for mounting a service hole blank cap of a console box as set forth in claim 1, wherein each of said fixing holes is formed on the top surface of the rim with a cutout opening in the transverse direction of the vehicle, and each of said fixing pieces is provided with a movement control piece having a shape suitable for receiption within said cutout.

4. The construction for mounting a service hole blank cap of a console box as set forth in claim 3, wherein each fixing piece includes a fixing piece body from which said movement control piece transversely extends, the fixing piece body extending downward to a greater extent than the movement control piece.

5. The construction for mounting a service hole blank cap of a console box as set forth in claim 1, wherein the fixing holes and the fixing pieces are arranged in pairs at positions opposed to each other in the transverse direction of the service hole, the fixing pieces being connected to each other by a reinforcement integrally formed on the undersurface of the blank cap.

6. The construction for mounting a service hole blank cap of a console box as set forth in claim 3, wherein the fixing pieces, fixing holes and movement control pieces are arranged in pairs at positions opposed to each other in the transverse direction of the service hole, the movement control pieces being connected to each other by a reinforcement member integrally formed on the undersurface of the blank cap.

7. The construction for mounting a service hole blank cap of a console box as set forth in claim 2, wherein first and second pairs of engaging pieces are provided on the undersurface of the blank cap, the engaging pieces in any one pair of engaging pieces being arranged in positions opposed to each other in the transverse direction of the service hole, the first pair of engaging pieces being located at a forward end portion of said blank cap opposite said rearward end portion, the second pair of engaging pieces being located between said first pair and said two fixing pieces.

8. The construction for mounting a service hole blank cap of a console box as set forth in claim 1, wherein said at least one engaging piece is resilient and includes a pawl portion for engagement with the undersurface of said rim.

9. The construction for mounting a service hole blank cap of a console box as set forth in claim 2, wherein said blank cap includes a bent end portion means at the rearward end portion of said blank cap for applying a force to said rearward end portion to remove said blank cap from said service hole.

10. The construction for mounting a service hole blank cap of a console box according to claim 1, wherein at least one switch mounting hole is located adjacent to said service hole blank cap so that said service hole is used to mount at least one corresponding switch in said at least one switch mounting hole.

11. The construction for mounting a service hole blank cap of a console box according to claim 1, wherein the reception of said at least one fixing piece within said at least one fixing hole reinforces said rim to prevent flexing thereof such that said blank cap is prevented from falling within said service hole if a downward force is applied to said blank cap.

12. The construction for mounting a service hole blank cap of a console box as set forth in claim 1, wherein at least one inner wall of said at least one fixing hole includes an insertion guide surface that is inclined to align said fixing piece for insertion within said fixing hole.

13. The construction for mounting a service hole blank cap of a console box as set forth in claim 1, wherein at least one side surface of said fixing piece includes an insertion guide surface that is inclined to align said fixing piece for insertion within said fixing hole.

14. A construction for mounting a service hole blank cap in a service hole of a console box for a motor vehicle having longitudinal and transverse axes, a longitudinal slit being formed in said console box through which a portion of a hand brake lever penetrates, said portion of said hand brake lever being located adjacent a rearward end portion of said blank cap, a portion of said slit defining said service hole, the construction comprising:

a rim defining a periphery of said service hole, said rim having a top surface and an undersurface, an undersurface of a peripheral edge of said blank cap abutting against a top surface of said rim;

a first pair of engaging pieces formed on an undersurface of the blank cap and engaging the undersurface of the rim of the service hole to thereby releaseably mount said blank cap on said rim in said surface hole, the engaging pieces in said first pair of engaging pieces being arranged in positions opposite to each other on the undersurface of the blank cap in the transverse direction of the service hole, the first pair of engaging pieces being located at a forward end portion of said blank cap opposite said rearward end portion;

a pair of fixing holes each being formed in the top surface of the rim on each longitudinal side of said service hole, said pair of fixing holes being provided at positions adjacent the rearward end portion of said blank cap nearest the hand brake lever; and a corresponding pair of fixing pieces formed on the undersurface of the blank cap on each longitudinal side thereof, each fixing piece having a shape and location adapted for reception within a corresponding one of said pair of fixing holes to prevent longitudinal and transverse movement of the blank cap in the service hole.

15. The construction for mounting a service hole blank cap of a console box as set forth in claim 14, wherein each fixing piece of the pair of fixing pieces is provided with a movement control piece having a shape suitable for reception within a cutout formed in each of the fixing holes.

16. The construction for mounting a service hole blank cap of a console box as set forth in claim 15, wherein the fixing pieces are connected to each other by a reinforcement integrally formed on the undersurface of the blank cap.

17. The construction for mounting a service hole blank of a console box as set forth in claim 14, wherein each of the pair of fixing holes includes an inclined insertion guide surface for aligning the corresponding pair of fixing pieces for insertion within said fixing holes.

* * * * *